United States Patent
Yi (10) Patent No.: US 11,014,524 B2
(45) Date of Patent: May 25, 2021

(54) HIGH-PRESSURE GAS CYLINDER

(71) Applicant: G-SHANG METAL CORPORATION, Taichung (TW)

(72) Inventor: Chen-Hsing Yi, Taichung (TW)

(73) Assignee: G-SHANG METAL CORPORATION, Taichung (TW)

( * ) Notice: Subject to any disclaimer, the term of this patent is extended or adjusted under 35 U.S.C. 154(b) by 159 days.

(21) Appl. No.: 15/999,018

(22) Filed: Aug. 20, 2018

(65) Prior Publication Data

US 2018/0370480 A1     Dec. 27, 2018

Related U.S. Application Data (63) Continuation of application No. 14/979,046, filed on Dec. 22, 2015.

(30) Foreign Application Priority Data

Jan. 14, 2015     (TW) .................................. 104200594

(51) Int. Cl.
| | |
|---|---|
| *B60R 21/264* | (2006.01) |
| *F17C 1/00* | (2006.01) |
| *F17C 13/06* | (2006.01) |
| *B60R 21/274* | (2011.01) |
| *F17C 13/04* | (2006.01) |

(52) U.S. Cl.
CPC .............. *B60R 21/264* (2013.01); *F17C 1/00* (2013.01); *F17C 13/04* (2013.01); *F17C 13/06* (2013.01); *B60R 21/274* (2013.01); *F17C 2201/0104* (2013.01); *F17C 2205/0308* (2013.01); *F17C 2260/01* (2013.01); *F17C 2270/0181* (2013.01)

(58) Field of Classification Search
CPC ..... B60R 21/264; B60R 21/274; F17C 13/06; F17C 1/00; F17C 2270/0181; F17C 2205/0308; F17C 2260/01; F17C 2201/0104; F17C 13/04
USPC ......................................................... 220/601
See application file for complete search history.

(56) References Cited

U.S. PATENT DOCUMENTS

| | | | | |
|---|---|---|---|---|
| 1,753,871 A | | 4/1930 | Schworetzky | |
| 2,496,877 A | * | 2/1950 | Krueger ................... | B65B 7/28 53/405 |
| 2,547,606 A | * | 4/1951 | Staller ...................... | B67C 3/06 141/55 |
| 2,613,849 A | * | 10/1952 | Ward ....................... | F17C 13/06 222/5 |
| 4,262,713 A | * | 4/1981 | Egami ..................... | B01F 3/02 141/171 |

(Continued)

*Primary Examiner* — Nathaniel C Chukwurah
*Assistant Examiner* — Mobeen Ahmed
(74) *Attorney, Agent, or Firm* — Finnegan, Henderson, Farabow, Garrett & Dunner, LLP (57) ABSTRACT

An improved high-pressure gas cylinder is provided, which includes a container and a plug. The container has an air passage which communicates an interior of the container with an exterior of the container. The plug includes a body and a sealing sheet, wherein the body is fixed in the air passage. The body has a hole which communicates with the interior of the container, and the sealing sheet covers the hole. The body and the sealing sheet are integral. Whereby, the plug is able to tightly seal the container to reduce the possibility of wasting gas; additionally, the manufacturing process would be less complicated and efficient with the simplified plug.

16 Claims, 6 Drawing Sheets

(56) References Cited

U.S. PATENT DOCUMENTS

| | | | |
|---|---|---|---|
| 4,938,376 A * | 7/1990 | Fieseler | F16J 15/021 |
| | | | 220/203.12 |
| 5,280,951 A * | 1/1994 | Rizzi | B60R 21/272 |
| | | | 280/736 |
| 5,356,176 A | 10/1994 | Wells | |
| 5,464,247 A * | 11/1995 | Rizzi | F42B 3/045 |
| | | | 280/737 |
| 5,526,853 A * | 6/1996 | McPhee | A61J 1/2089 |
| | | | 141/114 |
| 5,573,043 A * | 11/1996 | Fuehrer | B65B 31/003 |
| | | | 141/20 |
| 5,609,362 A | 3/1997 | Sparks et al. | |
| 5,620,204 A * | 4/1997 | Frey | B60R 21/264 |
| | | | 280/737 |
| 5,664,804 A * | 9/1997 | Saccone | B60R 21/264 |
| | | | 137/68.13 |
| 5,673,934 A * | 10/1997 | Saccone | B60R 21/264 |
| | | | 222/3 |
| 5,742,030 A * | 4/1998 | Booker | B23K 20/007 |
| | | | 219/158 |
| 5,787,563 A * | 8/1998 | Jenkins | B60R 21/268 |
| | | | 219/91.2 |
| 5,813,694 A * | 9/1998 | Jeong | B60R 21/217 |
| | | | 280/737 |
| 7,165,581 B2 * | 1/2007 | Chantalat | A23L 2/54 |
| | | | 141/64 |
| 2003/0136091 A1* | 7/2003 | Takahashi | B65B 31/02 |
| | | | 53/510 |
| 2007/0051073 A1* | 3/2007 | Kelley | B65D 1/0246 |
| | | | 53/440 |
| 2009/0293436 A1* | 12/2009 | Miyazaki | B67C 3/045 |
| | | | 53/471 |
| 2011/0094618 A1* | 4/2011 | Melrose | B65B 31/06 |
| | | | 141/11 |
| 2015/0300568 A1* | 10/2015 | Smits | B65B 53/02 |
| | | | 53/440 |
| 2015/0329341 A1* | 11/2015 | Wilder | F17C 1/00 |
| | | | 206/0.6 |
| 2016/0348847 A1* | 12/2016 | Wilder | F17C 5/06 |

\* cited by examiner

FIG. 6

HIGH-PRESSURE GAS CYLINDER

CROSS-REFERENCE TO RELATED PATENT APPLICATIONS

This application is a continuation application of U.S. patent application Ser. No. 14/979,046 filed on Dec. 22, 2015, which claims priority to and the benefits of priority of Taiwan Patent Application No. 104200594 filed on Jan. 14, 2015, both of which are incorporated herein by reference in their entireties.

BACKGROUND OF THE INVENTION

1. Technical Field

The present invention relates generally to a gas cylinder with fixed volume, and more particularly to an improved high-pressure gas cylinder.

2. Description of Related Art

High-pressure gas cylinders are commonly used in inflators of air bags in vehicles. More specifically, when a car has a high-speed collision, a sealing sheet which seals a high-pressure gas cylinder installed in the car would be pierced by a piercing tube. Therefore, the high-pressure gas in the cylinder inflates an air bag instantly to ensure the safety of the driver or passengers.

A conventional high-pressure gas cylinder includes a sealing sheet and a plug, wherein the sealing sheet covers an opening of the cylinder, and is fixed by the plug. However, the sealing sheet and the plug are detachably connected to each other so that a gap tends to be formed therebetween, which may cause the high-pressure gas cylinder not to be tightly sealed, and the gas in the cylinder may subsequently escape through the gap.

Additionally, in the manufacturing process of a high-pressure gas cylinder, more components used to seal the cylinder take more steps in assembly. On the other hand, in an ideal manufacturing process, once the cylinder is filled with gas, sealing components should be able to seal the cylinder immediately to prevent the gas from escaping, and therefore to reduce waste of gas and the manufacturing cost. Accordingly, it is an important issue for manufacturers to simplify the components of a high-pressure gas cylinder, as well as to tightly seal the cylinder in the manufacturing process.

BRIEF SUMMARY OF THE INVENTION

In view of the above, the primary objective of the present invention is to provide an improved high-pressure gas cylinder, which includes an integral plug without separable components or any gaps between the components. In addition, in the manufacturing process, the plug seals the cylinder immediately upon the cylinder is filled with gas to avoid the gas from escaping.

The present invention provides an improved high-pressure gas cylinder, which includes a container and a plug, wherein the container has an air passage which communicates an interior of the container with an exterior of the container. The plug includes a body and a sealing sheet, wherein the body is fixed in the air passage. The body has a hole which communicates with the interior of the container, and the sealing sheet covers the hole. The body and the sealing sheet are integral.

Whereby, by using the integral plug, it not only reduces the possibility of wasting gas, but also simplifies the manufacturing process of the high-pressure gas cylinder.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
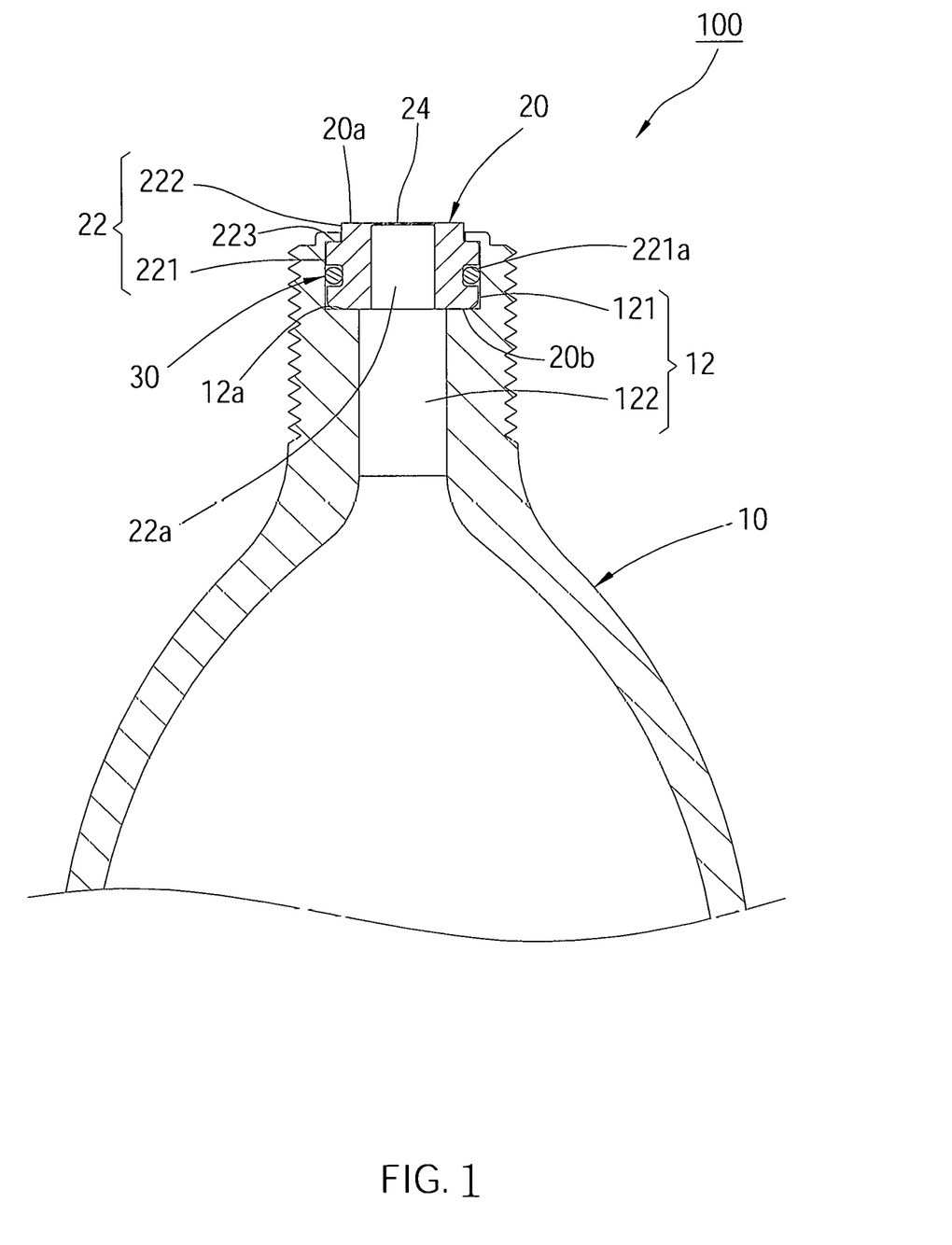
FIG. 1 is a partial sectional view of a first preferred embodiment of the present invention, showing the improved high-pressure gas cylinder.

As shown in FIG. 1, high-pressure gas cylinder 100 includes a container 10, a plug 20, and an outer sealing ring 30.

The container 10 has an air passage 12 which communicates an interior of the container with an exterior of the container 10. The air passage 12 has a first air passage 121 and a second air passage 122 which communicates with the first air passage 121, wherein the first air passage 121 communicates with the exterior of the container 10, and the second air passage 122 communicates with the interior of the container 10. An internal diameter of the first air passage 121 is greater than that of the second air passage 122, and a stop surface 12a is formed between the first air passage 121 and the second air passage 122.

The plug 20 is located in the first air passage 121, and has a top surface 20a and a bottom surface 20b, wherein the top surface 20a faces the exterior of the container 10, and the bottom surface 20b faces the interior of the container 10. In addition, the plug 20 includes a body 22 and a sealing sheet 24. The body 22 has a first section 221 and a second section 222 connected to the first section 221, wherein the bottom surface 20b of the plug 20 is formed on the first section 221. The bottom surface 20b of the plug 20 contacts the stop surface 12a of the container 10. An external diameter of the second section 222 is smaller than that of the first section 221, wherein the top surface 20a of the plug 20 is formed on the second section 222, and a shoulder 223 is formed between the first section 221 and the second section 222.

The body 22 has a hole 22a thereof which communicates with the interior of the container 10. The sealing sheet 24 and the body 22 are integral, more specifically, the sealing sheet 24 and the body 22 are formed as an integral and non-detachable piece. The sealing sheet 24 is a metal sheet in the first preferred embodiment, and is provided inside the hole 22a to cover the hole 22a. The sealing sheet 24 in the first preferred embodiment is provided at a top of the hole 22a, wherein the top of the hole 22a is close to the exterior of the container 10. With such design, the top surface 20a of the plug 20 is formed on both the sealing sheet 24 and the second section 222. Whereby, by using the abovementioned integral plug 20, the waste of gas due to gas escaping from gaps between components would be reduced. Additionally, the plug 20 could be fixed in the air passage 12 of the container 10, for the problem of loose components no longer exists.

Figure 2:
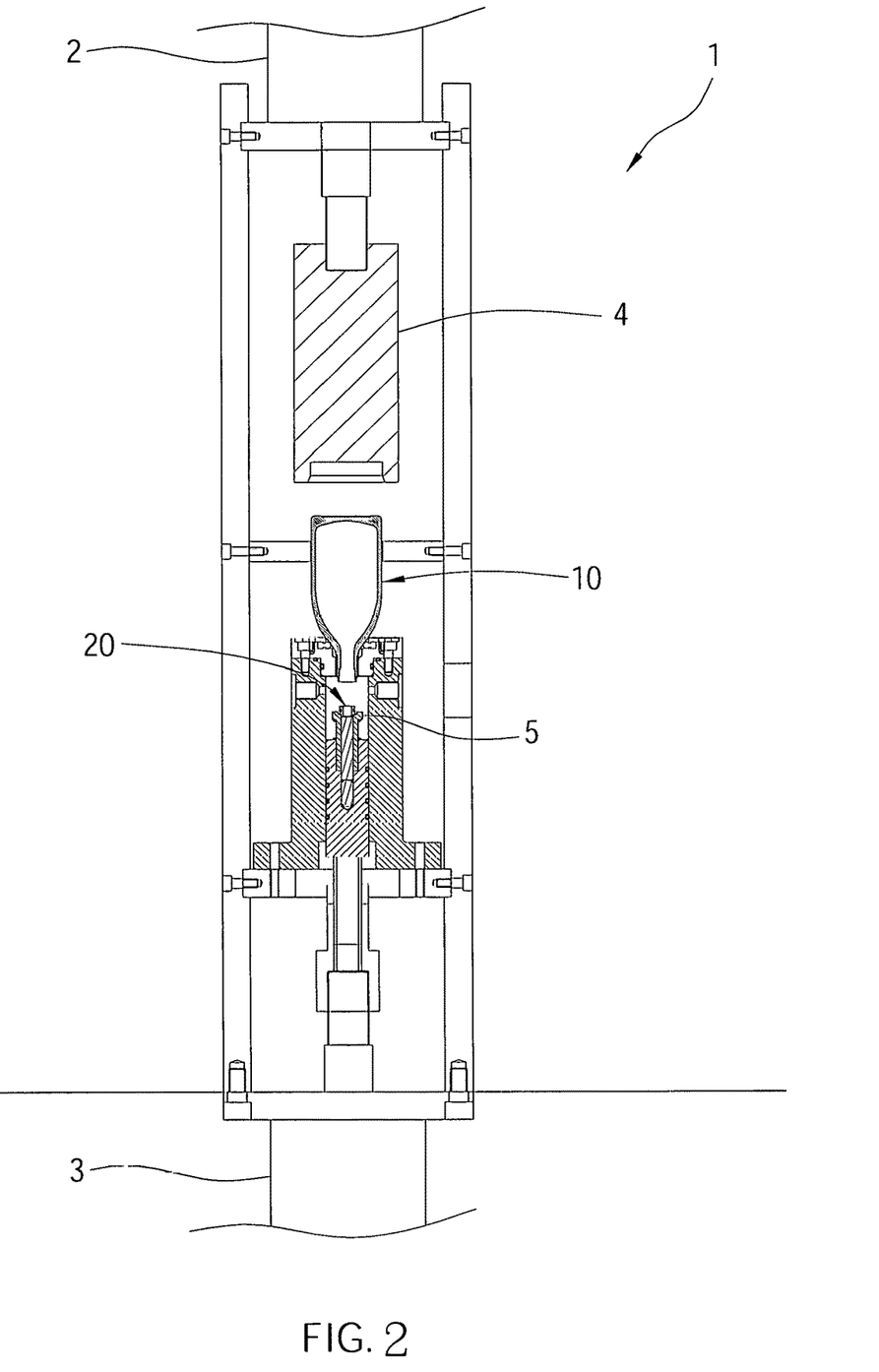
FIG. 2 is a schematic diagram of the manufacturing device for the high-pressure gas cylinder in FIG. 1.
Figure 3:
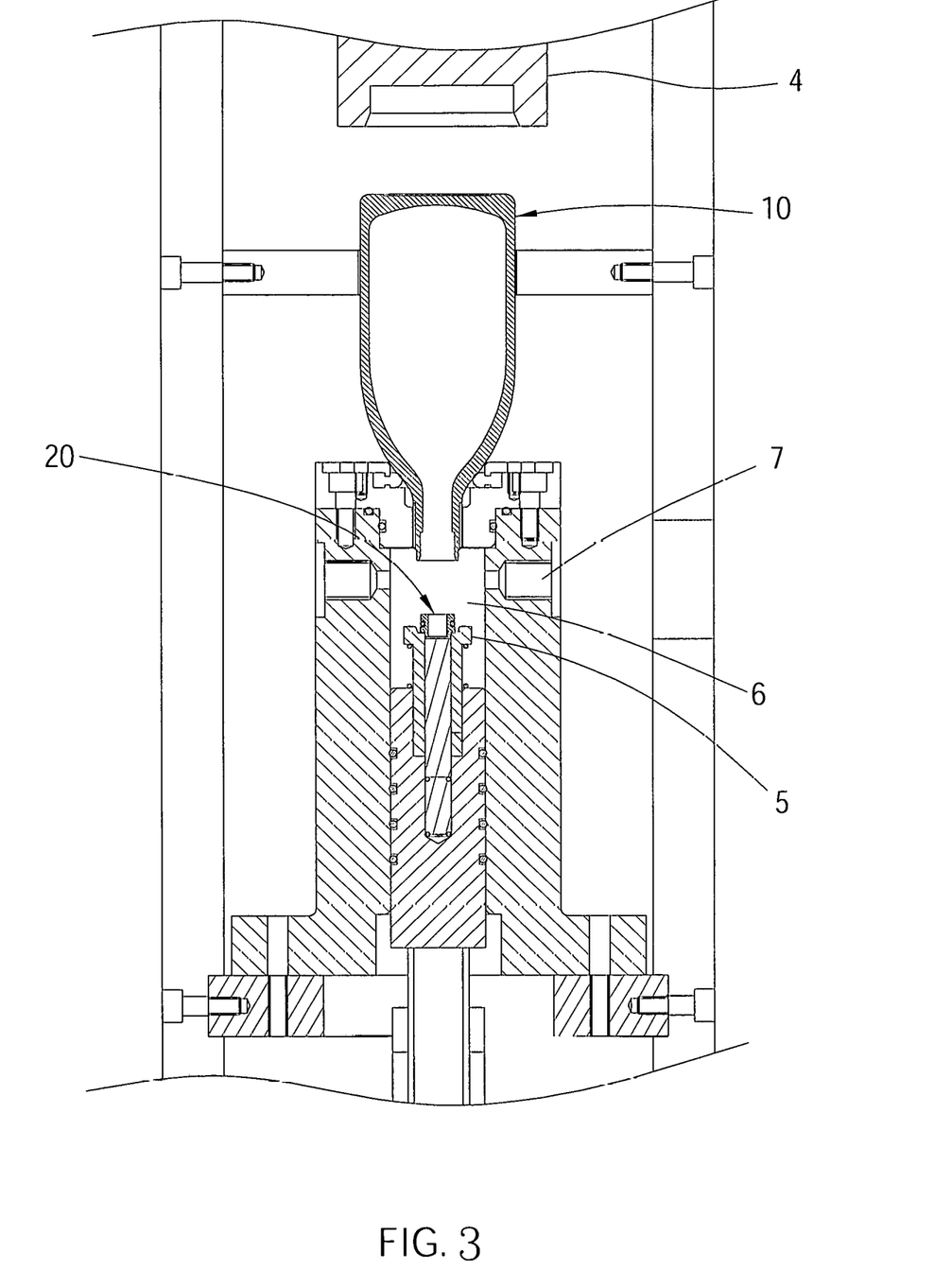
FIG. 3 is a partial enlarged view of FIG. 2, showing the gas is poured into the container through the air chamber.
Figure 4:
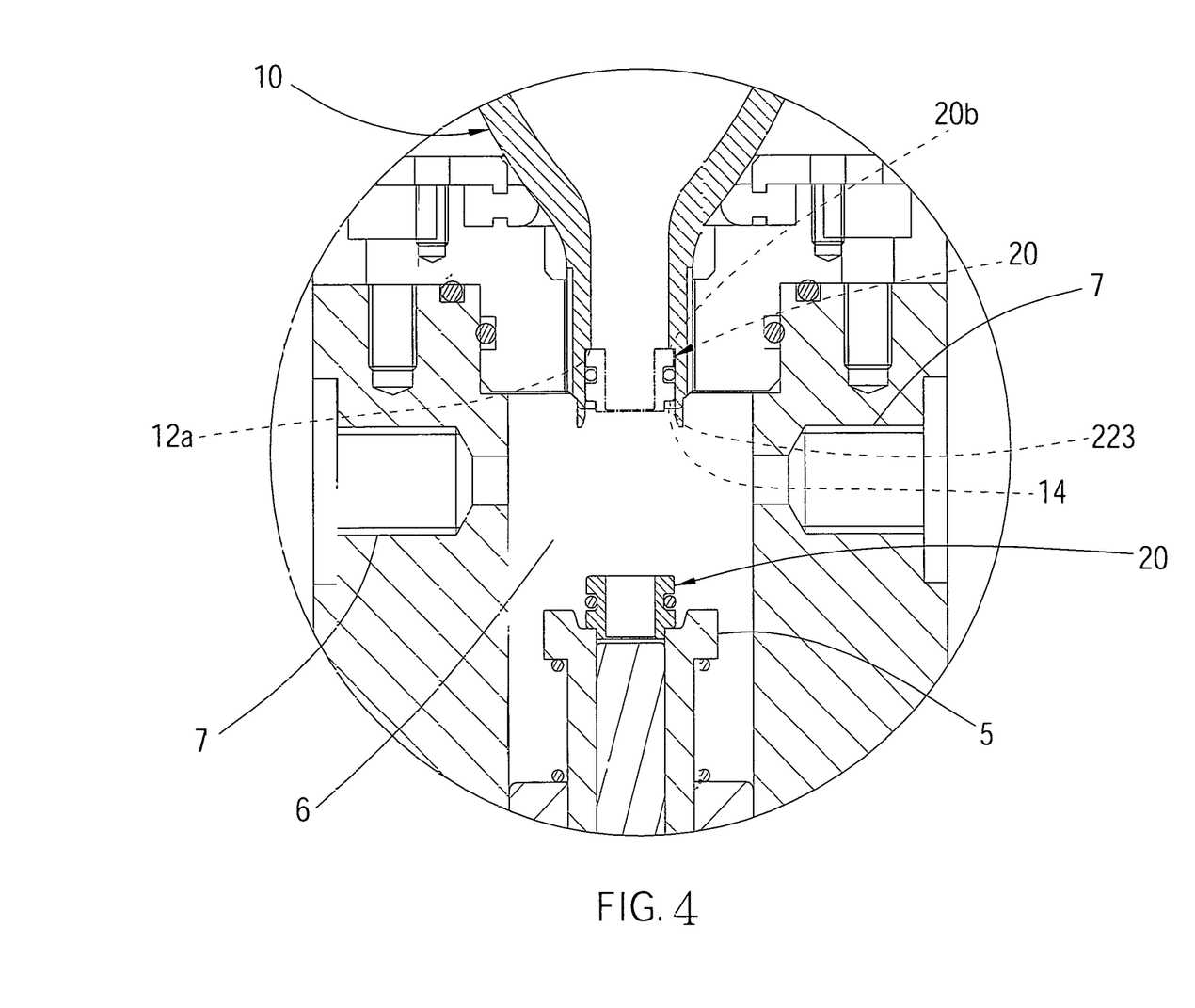
FIG. 4 is a partial enlarged view of FIG. 3, showing the plug seals the container, and the ring wall which surrounds the opening of the container is deformed to form the stop ring.

The plug 20 is connected to the container 10 through the manufacturing method and device illustrated in FIG. 2 to FIG. 4. The manufacturing device 1 for the high-pressure gas cylinder 100 includes an upper push rod 2 and a lower push rod 3, which are able to be forced to move toward opposite directions respectively. The upper push rod 2 is connected to a holding member 4, and the lower push rod 3 is connected to a pressing member 5, wherein the plug 20 is clutched by the pressing member 5, and is drivable to move by the pressing member 5. On the other hand, the container 10 is fixed between the holding member 4 and the plug 20.

As shown in FIG. 3, the manufacturing device 1 further has an air chamber 6 and two intake pipes 7. The air chamber 6 is space formed between the container 10 and the plug 20, and communicates with the interior of the container 10. The two intake pipes 7 are used to pour gas into the air chamber 6, and afterwards into the interior of the container 10. Once the container 10 is filled with gas, both the upper push rod 2 and the lower push rod 3 are moved toward the container 10, and the plug 20 is accordingly pushed into the first air passage 121 of the container 10 by the pressing member 5. On the other side, the bottom of the container 10 is held by the holding member 4 to avoid moving upwards by the push of the pressing member 5.

As depicted in FIG. 4, the plug 20 is pushed to abut against the stop surface 12a of the container 10 with the bottom surface 20b thereof. At the same time, a ring wall which surrounds an opening of the container 10 is deformed to form a bend-shaped stop ring 14, which abuts against the shoulder 223 of the body 22. Whereby, the body 22 is fixed into the first air passage 121 through abutting against the stop surface 12a as well as the stop ring 14 of the container 10.

Therefore, with the integral plug 20, the container 10 is able to be sealed through a single pressing process. Such manufacturing process is not only simplified but also time-saving.

In addition, the body 22 in the first preferred embodiment further has an outer circular groove 221a formed on an outer wall of the first section 221, wherein the outer sealing ring 30 is embedded in the outer circular groove 221a, and the outer sealing ring 30 abuts against a passage wall of the air passage 12 of the container 10 with an outer surface thereof, which is shown in FIG. 1. In this way, the outer sealing ring 30 is able to prevent gas from escaping through the first air passage 121, which reduces the possibility of wasting gas.

Figure 5:
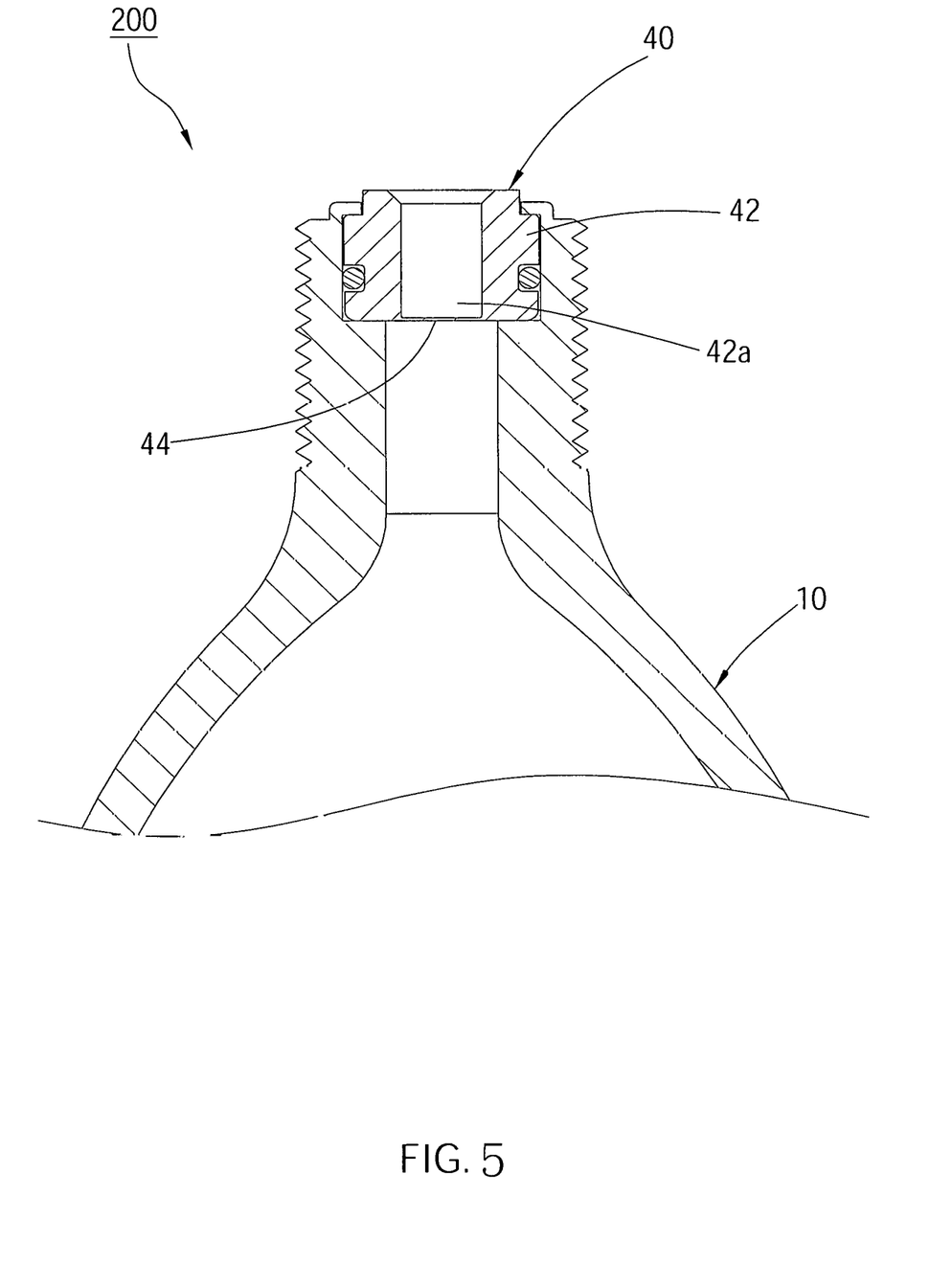
FIG. 5 is a partial sectional view of a second preferred embodiment of the present invention, showing the sealing sheet is provided at the bottom of the hole of the plug.

As shown in FIG. 5, a high-pressure gas cylinder 200 includes not only the container 10 but also a plug 40. The plug 40 includes a body 42 and a sealing sheet 44, wherein the body 42 has a hole 42a communicating with the interior of the container 10, and the sealing sheet 44 covers the hole 42a. The difference between the plug 40 in the second preferred embodiment and the plug 20 in the first preferred embodiment is that, the sealing sheet 44 is provided at a bottom of the hole 42a, wherein the bottom of the hole 42a is close to the interior of the container 10. With such design, partial of a bottom surface of the plug 40 is formed on the sealing sheet 44. Whereby, a piercing tube (not shown) would pass through the hole 42a before piercing the sealing sheet 44, wherein the piercing tube would abut against the wall of the hole 42a. In this way, once the sealing sheet 44 is pierced by the piercing tube, gas in the container 10 could almost rush into the piercing tube without escaping from the hole 42a, which also reduces the waste of gas in the container 10.

Figure 6:
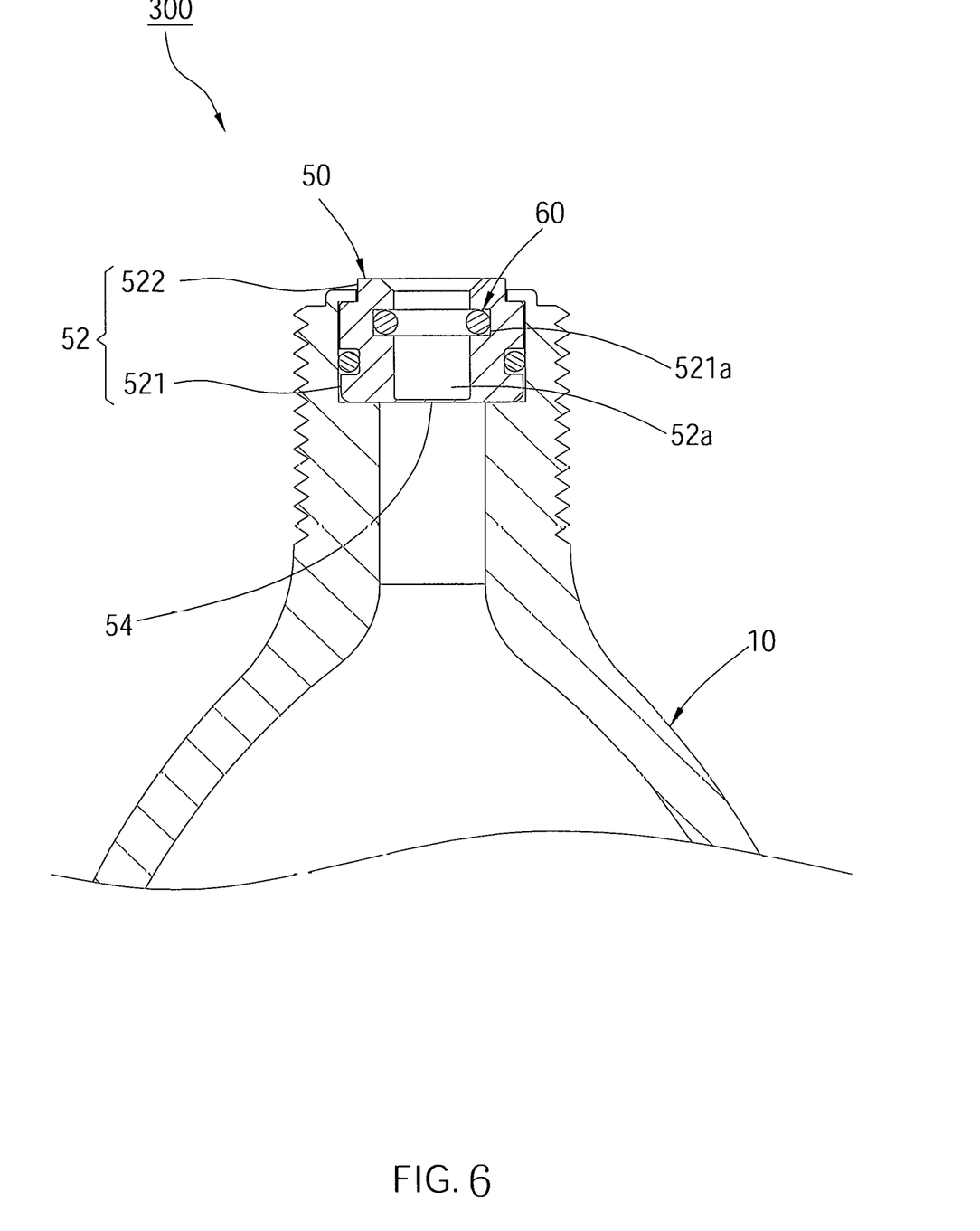
FIG. 6 is a partial sectional view of a third preferred embodiment of the present invention, showing an inner sealing ring is embedded in the plug.

A high-pressure gas cylinder 300 illustrated in FIG. 6 also includes a container 10, and further includes a plug 50 and an inner sealing ring 60. The plug 50 includes a body 52 and a sealing sheet 54, wherein the body 52 includes a first section 521 which is close to the interior of the container 10, and a second section 522 which is close to the exterior of the container 10. Similar to the body 42, the body 52 has a hole 52a communicating with the interior of the container 10, wherein the sealing sheet 54 is provides at a bottom of the hole 52a, wherein the bottom of the hole 52a is close to the interior of the container 10.

Especially, the body 52 has an inner circular groove 521a formed on a wall surrounding the hole 52a, and the inner sealing ring 60 is embedded in the inner circular groove 521a. An internal diameter of the inner sealing ring 60 is slightly smaller than a diameter of the hole 52a, which makes an inner surface of the inner sealing ring 60 position into the hole 52a. With such design, the piercing tube would tightly abut against the inner surface of the inner sealing ring 60 once the piercing tube pierces the sealing sheet 54, which makes sure that gas from the container 10 would not escape from the hole 52a, and gas in the container 10 would be effectively used.

It must be pointed out that the embodiment described above is only a preferred embodiment of the present invention. All equivalent structures which employ the concepts disclosed in this specification and the appended claims should fall within the scope of the present invention.

What is claimed is:

1. A method of manufacturing a high-pressure container, comprising:
   holding a container having an opening surrounded by a wall, the opening being in communication with an interior of the container;
   clutching a plug having a body and a sealing sheet;
   injecting a gas into the interior of the container through the opening of the container;
   pushing the plug into the opening of the container; and
   moving the plug toward the interior of the container, while simultaneously deforming the wall surrounding the opening of the container to abut against the body of the plug;
   providing a holding member for holding a bottom of the container;
   providing a pressing member for clutching the plug;
   moving the holding member toward the bottom of the container and, simultaneously, moving the pressing member clutching the plug toward the container; and
   holding the bottom of the container by the holding member while the plug is being pushed into the opening of the container.

2. The method of claim 1, further comprising:
   clutching the plug at a shoulder of the body of the plug; and
   deforming the wall surrounding the opening of the container to abut against the shoulder of the body of the plug.

3. The method of claim 1, further comprising:
orienting the plug so that the sealing sheet of the plug faces away from the interior of the container when the plug is pushed into the opening of the container.

4. The method of claim 1, further comprising:
positioning the plug in the opening of the container such that the sealing sheet of the plug protrudes from the opening of the container after the wall surrounding the opening of the container is deformed to abut against the body of the plug.

5. The method of claim 1, further comprising:
clutching the plug by a first end of the plug so that a second end of the plug faces the opening of the container, the first end and the second end being at opposite ends of the body, and the sealing sheet being provided at the first end of the plug.

6. The method of claim 1, further comprising:
holding a bottom of the container by a holding member.

7. The method of claim 1, further comprising:
providing a holding member and a pressing member;
connecting an upper push rod to the holding member; and
connecting a lower push rod to the pressing member;
wherein the pressing member clutches the plug, the upper push rod is engaged to move the holding member toward the container, and the lower push rod is engaged to move the pressing member toward the container.

8. The method of claim 7, further comprising:
holding the container with the holding member while the plug is pushed into the opening of the container.

9. The method of claim 8, wherein the plug is clutched by and pushed into the opening of the container by the pressing member.

10. A method of manufacturing a high-pressure gas cylinder, comprising:
holding a cylinder having an opening surrounded by a wall, the opening being in communication with an interior of the cylinder;
clutching, by a pressing member, a plug having a body and a sealing sheet;
injecting a gas into the interior of the cylinder through the opening of the cylinder;
moving the pressing member toward the cylinder to push the plug into the opening of the cylinder; and
moving the pressing member to simultaneously move the plug toward the interior of the cylinder and deform the wall surrounding the opening of the cylinder so that the wall is bent to abut against the body of the plug, wherein the pressing member is connected to a first push rod, and the first push rod is manipulated to move the pressing member clutching the plug toward the cylinder;
providing a holding member connected to a second push rod; and
manipulating the second push rod to move the holding member toward the cylinder while the pressing member is being moved by the first push rod toward the cylinder.

11. The method of claim 10, wherein the plug has a top surface, a bottom surface opposed to the top surface, and a shoulder between the top and bottom surfaces, at least part of the top surface being formed on the sealing sheet, and the plug being clutched by the pressing member at the shoulder of the plug so that the top surface faces away from the cylinder and the bottom surface faces toward the cylinder when the plug is being moved by the pressing member toward the cylinder.

12. The method of claim 10, wherein the wall surrounding the opening of the cylinder is bent to abut against a shoulder of the body of the plug so that the sealing sheet of the plug protrudes from the opening of the cylinder.

13. The method of claim 10, wherein the plug has a first end at which the sealing sheet is provided and a second end opposing the first end, the plug is clutched by the pressing member such that the second end is closer to the cylinder than the first end when the plug is moved by the pressing member toward the cylinder.

14. The method of claim 10, further comprising:
holding, by the holding member, a bottom of the cylinder to avoid the cylinder being moved by pushing the plug into the opening of the cylinder and moving the plug in the opening of the cylinder.

15. A method of manufacturing a gas cylinder, comprising:
holding, by a holding member, a cylinder in a chamber, the cylinder being held by the holding member at a bottom of the cylinder, the cylinder having an interior in communication with an exterior of the cylinder via an opening of the cylinder, the opening being surrounded by a wall of the cylinder;
clutching, by a pressing member, a plug having a top surface, a bottom surface, and a sealing sheet forming at least part of the top surface, the top surface and the bottom surface being configured at opposite ends of the plug;
injecting a gas, via an intake pipe, into interior of the cylinder; and
pushing, by the pressing member, the bottom surface of the plug into the opening of the cylinder, while simultaneously deforming, by the pressing member, the wall surrounding the opening of the cylinder to abut against the plug,
wherein the holding member is connected to an upper push rod, the pressing member is connected to a lower push rod, and the upper and lower push rods are moved toward the cylinder before the plug is pushed into the opening of the cylinder, and
wherein the pressing member manipulates the plug so that the bottom surface of the plug faces toward the cylinder and the top surface of the plug faces away from the cylinder.

16. The method of claim 15, wherein the bottom surface of the plug is exposed in the chamber before it is pushed into the opening of the cylinder.

* * * * *